(12) United States Patent
de Pau, Jr. et al.

(10) Patent No.: US 10,808,577 B2
(45) Date of Patent: Oct. 20, 2020

(54) AERODYNAMIC DRAINAGE DEVICE

(71) Applicant: The Boeing Company, Chicago, IL (US)

(72) Inventors: Robert de Pau, Jr., Kenmore, WA (US); Paul Brian Philipp, Woodinville, WA (US); Samuel James Tutko, Renton, WA (US); Fedor Kleshchev, Seattle, WA (US); Garrett Daniel Klovdahl, Everett, WA (US)

(73) Assignee: The Boeing Company, Chicago, IL (US)

( * ) Notice: Subject to any disclaimer, the term of this patent is extended or adjusted under 35 U.S.C. 154(b) by 587 days.

(21) Appl. No.: 15/472,088

(22) Filed: Mar. 28, 2017

(65) Prior Publication Data

US 2018/0283217 A1     Oct. 4, 2018

(51) Int. Cl.
*F01D 25/32* (2006.01)
*B64D 29/00* (2006.01)

(52) U.S. Cl.
CPC .............. *F01D 25/32* (2013.01); *B64D 29/00* (2013.01); *F05D 2220/323* (2013.01); *F05D 2260/602* (2013.01)

(58) Field of Classification Search
CPC ....... F01D 25/32; B64D 29/00; B64C 1/1453; F05D 2260/602; F05D 2220/323
See application file for complete search history.

(56) References Cited

U.S. PATENT DOCUMENTS

| 2,730,402 A | * | 1/1956 | Whiting, Jr. ............. | B64D 1/16 239/171 |
| 3,556,444 A | * | 1/1971 | Kopp .................. | B64C 29/0091 222/108 |

(Continued)

FOREIGN PATENT DOCUMENTS

| EP | 3028941 A1 | 6/2016 |
| EP | 2562405 B1 | 8/2016 |

(Continued)

OTHER PUBLICATIONS

European Patent Office, Extended European Search Report regarding European Patent Application No. 18154945.2-1010, dated May 4, 2018, 10 pages.

(Continued)

*Primary Examiner* — Assres H Woldemaryam
(74) *Attorney, Agent, or Firm* — Kolisch Hartwell, P.C.

(57) ABSTRACT

Drainage devices intended to prevent the reentry of drained fluids, the devices including a base having a contact surface for mounting over a drainage opening in an aerodynamic surface, a mast portion connected to the base and extending away from the contact surface of the base, and a top portion connected to the end of the mast portion, the top portion having a periphery that is greater than the periphery of the mast portion and including an exit port. The top portion may include a cantilevered fence portion extending upstream relative to the aerodynamic surface, and the drainage devices may be part of a system including a first opening and a second opening in the aerodynamic surface, the second (Continued)

opening upstream from the first opening, where a drainage device is mounted over the first opening and the cantilevered fence portion of the drainage device extends upstream toward the second opening.

20 Claims, 5 Drawing Sheets

(56) References Cited

U.S. PATENT DOCUMENTS

| | | | | |
|---|---|---|---|---|
| 5,104,069 | A * | 4/1992 | Reising | B64D 1/16 244/129.1 |
| 5,239,822 | A | 8/1993 | Buchacher | |
| 5,285,636 | A * | 2/1994 | Mayo | F02C 7/00 244/129.1 |
| 5,996,938 | A * | 12/1999 | Simonetti | B64C 1/1453 244/129.1 |
| 7,651,055 | B2 * | 1/2010 | Turner | B64C 1/1453 244/129.1 |
| 8,662,448 | B2 * | 3/2014 | Weston | B64C 1/40 244/119 |
| 8,857,768 | B2 * | 10/2014 | Giamati | B64C 1/1453 244/136 |
| 8,899,519 | B2 * | 12/2014 | Smith | B64C 1/40 244/117 R |
| 9,315,253 | B2 * | 4/2016 | Lee | B64C 1/1453 |
| 2006/0273224 | A1 * | 12/2006 | Hoffjann | B64C 1/1453 244/136 |
| 2011/0121137 | A1 * | 5/2011 | Sandiford | B64C 1/1453 244/136 |
| 2015/0329195 | A1 * | 11/2015 | Wielgosz | B64C 1/1453 137/1 |
| 2016/0009358 | A1 * | 1/2016 | Gaudreau | B64C 1/1453 244/136 |
| 2016/0362998 | A1 * | 12/2016 | Engelhardt | H02K 44/10 |
| 2019/0162080 | A1 * | 5/2019 | Lamson | F01D 25/32 |

FOREIGN PATENT DOCUMENTS

| | | | |
|---|---|---|---|
| EP | 3216692 A1 * | 9/2017 | B64F 5/00 |
| EP | 3216692 A1 | 9/2017 | |
| WO | 0230745 A1 | 4/2002 | |

OTHER PUBLICATIONS

European Patent Office, Examination Report regarding European Patent Application No. 18 154 945.2-1010, dated Aug. 14, 2019, 6 pages.

European Patent Office, Examination Report regarding European Patent Application No. 18 154 945.2-1010, dated Mar. 16, 2020, 5 pages.

* cited by examiner

AERODYNAMIC DRAINAGE DEVICE

FIELD

This disclosure relates to drainage devices, or scuppers, for drainage ports on vehicles, and more specifically to drainage devices for drainage ports for aircraft compartments.

BACKGROUND

U.S. Airworthiness standards are crafted to maintain the safety of air transportation. Among these many regulations, 14 C.F.R. § 25.1187 requires adequate drainage and ventilation of compartments that may accumulate fluids. Furthermore, drainage must be arranged so that no discharged fluid may cause an additional fire hazard.

For a given compartment on an aircraft, a simple drainage port or aperture may serve as an adequate drainage system. However, once a fluid is discharged from the aircraft, it may then run along the outer skin of the aircraft under the influence of the surrounding airflow, and may then be ingested by a second drainage port downstream.

In an effort to prevent the ingestion of drained fluids, drainage ports have sometimes been fitted with structures intended to prevent fluids on the outer skin of the aircraft from entering a downstream port without interfering with drainage, with some success. As an alternative to a drainage port, some compartments have been fitted with a dedicated drain mast that projects from the aircraft surface beyond the aerodynamic boundary layer. Such drain masts are however relatively large and can create a significant amount of drag.

SUMMARY

The present disclosure provides drainage devices for mounting over openings in aerodynamic surfaces, and drainage systems that include drainage devices for mounting over openings in aerodynamic surfaces.

In some aspects, the disclosure may provide a drainage device that includes a base configured for mounting over an opening in an aerodynamic surface, where the base has a contact surface that is configured to be mounted on the aerodynamic surface and an entry port. The drainage device may also include a mast portion having a proximate end connected to the base, the mast extending away from the contact surface of the base to a distal end of the mast. The drainage device may further include a top portion that is connected to the distal end of the mast portion, where the top portion has an exit port in fluid communication with the entry port. The top portion may further have a peripheral edge that extends beyond at least a portion of the periphery of the mast portion.

In some aspects, the disclosure may provide a drainage system that includes an aerodynamic surface on a vehicle, where the aerodynamic surface has an upstream portion and a downstream portion, where upstream and downstream are defined relative to the direction of the airflow over the aerodynamic surface when the vehicle is translating. An opening may be defined in the aerodynamic surface, and a scupper device may be mounted on the aerodynamic surface over the opening. The scupper device may include a cantilevered fence portion extending in the upstream direction.

In some aspects, the disclosure may provide a drainage system that includes an aerodynamic surface on a vehicle, where the aerodynamic surface has an upstream portion and a downstream portion defined relative to the airflow over the aerodynamic surface when the vehicle is translating. The drainage system may also include a first scupper device mounted over a first opening defined in the aerodynamic surface, where the first scupper device includes a cap that includes an exit port disposed downstream from the first opening in the aerodynamic surface.

The recited features, functions, and advantages of the disclosed devices and systems may be achieved independently in various aspects of the present disclosure, or may be combined in yet other aspects further details of which can be seen with reference to the following description and drawings.

DESCRIPTION

Various examples of drainage devices having one or more advantageous properties are described below and illustrated in the associated drawings. Unless otherwise specified, the disclosed drainage devices and/or drainage systems including the disclosed drainage devices may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar drainage devices.

The following description of various such examples is merely exemplary in nature and is in no way intended to limit the disclosure, its application, or uses. Additionally, the advantages provided by the examples, as described below, are illustrative in nature and not all examples may provide the same advantages or the same degree of advantages.

For example, the disclosed drainage devices may possess utility for use in any vehicle or means of transport that may achieve high speeds, that is, where the aerodynamic features of the disclosed drainage device may prove advantageous. However, for the purposes of providing an exemplary illustration of the disclosed drainage devices, their installation, and their applications, the drainage devices of the present disclosure may be described in the context of their use to facilitate drainage from selected aircraft compartments.

Similarly, although a commercial aircraft includes myriad internal compartments and partitioned spaces that may require adequate drainage and ventilation, it should be appreciated that compartments that are adjacent to, and particularly that may be disposed below an aircraft system that might discharge one or more fluids are of particular interest. For this reason although the drainage devices of the present disclosure may be useful for draining and/or venting any suitable aircraft compartment, the present disclosure may focus on compartments that are part of an engine nacelle and disposed beneath a jet engine.

Figure 1:
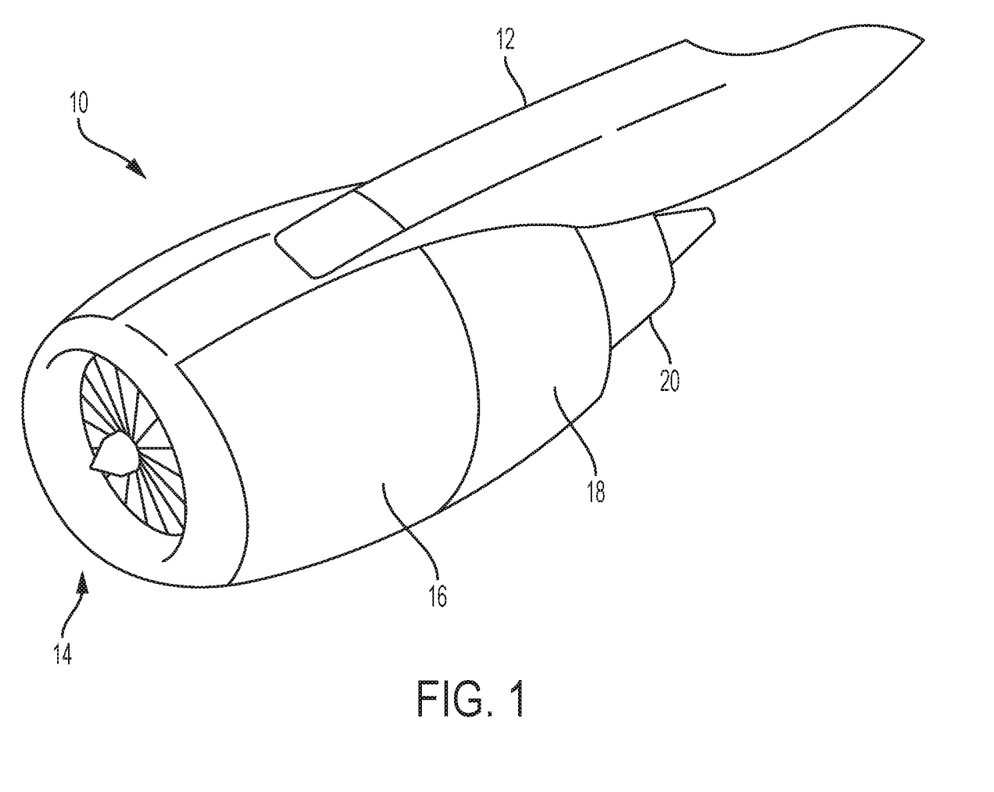
FIG. 1 is a depiction of an illustrative jet engine nacelle.

FIG. 1 depicts a jet engine nacelle 10 of a commercial aircraft, which may depend from an aircraft wing via a supporting pylon 12, and which may include an air intake 14, a fan cowl 16, a thrust reverser cowl 18, and an exhaust nozzle 20. Jet engine nacelle 10 may obviously incorporate many individual compartments, but the following discussion may focus on representative and illustrative nacelle compartments disposed beneath the jet engine, such as may be included in the undersurface of nacelle 10, and particularly within thrust reverser cowl 18 which would normally surround the jet engine within nacelle 10. Such compartments might be prone to accumulate fluids that have leaked or been otherwise discharged from the jet engine or other aircraft system.

Figure 2:
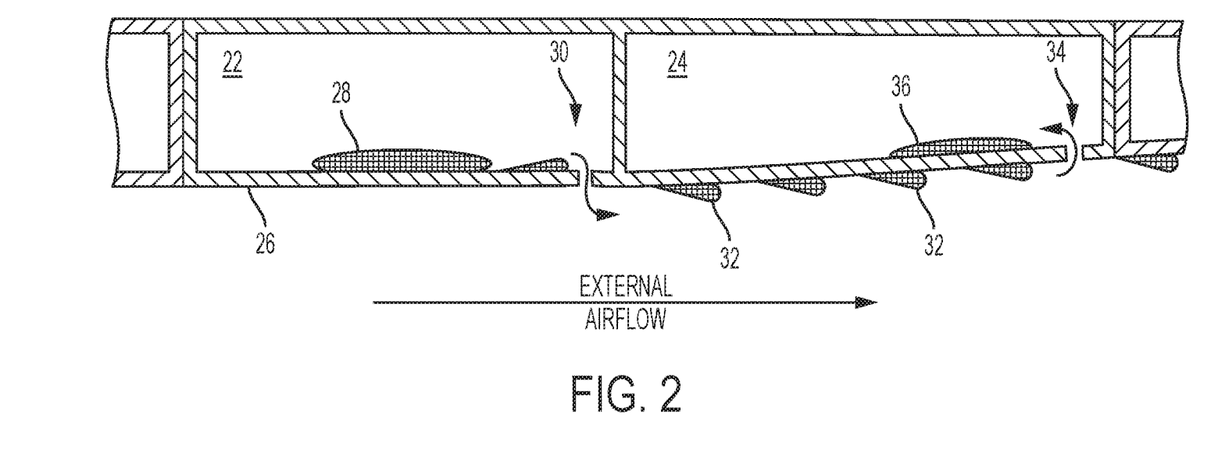
FIG. 2 is a semi-schematic and cross-sectional view of an exemplary forward compartment and aft compartment of an engine nacelle.

FIG. 2 corresponds to a simplified, semi-schematic, and cross-sectional view of a forward compartment 22 and an aft compartment 24 of engine nacelle 10. The view of FIG. 2 is a vertical cross-section along a plane parallel to the longitudinal axis of engine nacelle 10. Compartments 22 and 24 of engine nacelle 10 are disposed along a lower surface of the nacelle 10, for example along a lower portion of thrust reverser cowl 18, such that compartments 22 and 24 are disposed adjacent external surface 26 of nacelle 10.

FIG. 2 also depicts the accumulation of unwanted fluid 28 in forward compartment 22. As forward compartment 22 is equipped with an opening or drainage port 30, unwanted fluid 28 may flow via opening 30 to the external aerodynamic surface 26 of the nacelle.

Once drained fluid 32 is on exposed aerodynamic surface 26, the path taken by fluid 32 (or streakline) may be determined by the slope and texture of surface 26, as well as the speed and direction of the airflow created by the aircraft's passage through the atmosphere. In general however, such discharged fluid is generally blown aftward along surface 26 of nacelle 10. Unfortunately, as it flows aftward, fluid 32 may encounter an opening or drainage port 34 that may be configured to drain unwanted fluid from an aft compartment 24.

Unfortunately, if external moving fluid 32 encounters such an opening, static or dynamic differences in air pressure between the external airflow and the interior of aft compartment 24 may result in fluid 32 being ingested via opening 34 into aft compartment 24, resulting in the accumulation of unwanted fluid 36 in aft compartment 24.

Figure 3:
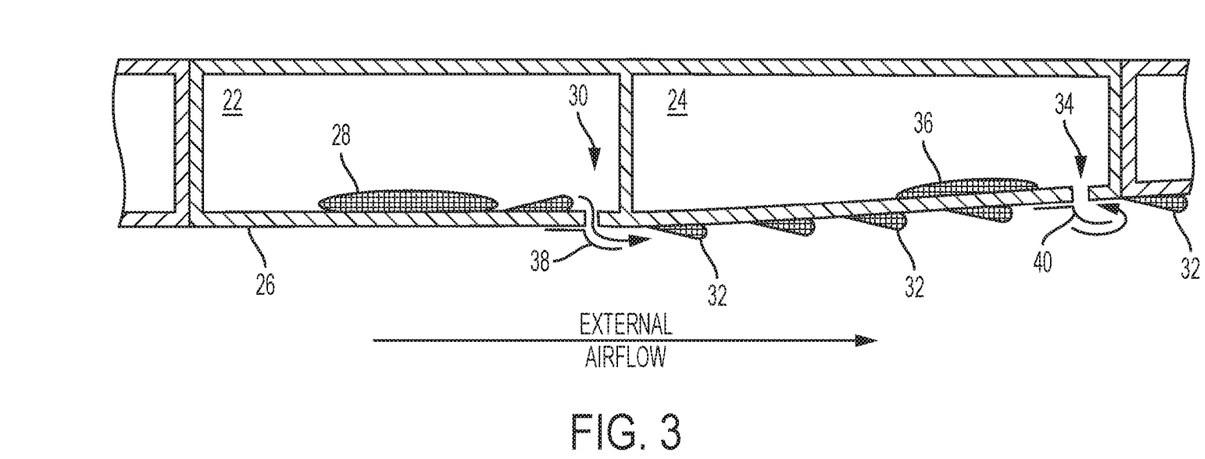
FIG. 3 depicts the exemplary compartments of FIG. 2 equipped with quarter-spherical scuppers.

Some attempts to help prevent ingestion of drained fluids have, in some cases, included equipping such drainage ports with scuppers—structures that are intended to divert fluids on the outer skin of the aircraft away from drainage port openings. Such a scupper may, for example, include a quarter-spherical shell mounted over the drainage port with the open mouth of the scupper facing downstream of the prevailing airflow, or aft, as shown in cross-section in FIG. 3, where a quarter-spherical scupper 38 is mounted on surface 26 so as to shield opening 30 and quarter-spherical scupper 40 is mounted on surface 26 so as to shield opening 34. Unfortunately, although the arc of the quarter-sphere of the scuppers may extend over the mouths of openings 30 and 34, a high-velocity flow of air over the quarter-spherical surface may help create a low pressure eddy aft of the scupper, which in turn may result in external fluid 32 being ingested into compartment 24 via opening 34, despite the presence of scupper 40.

Figure 4:
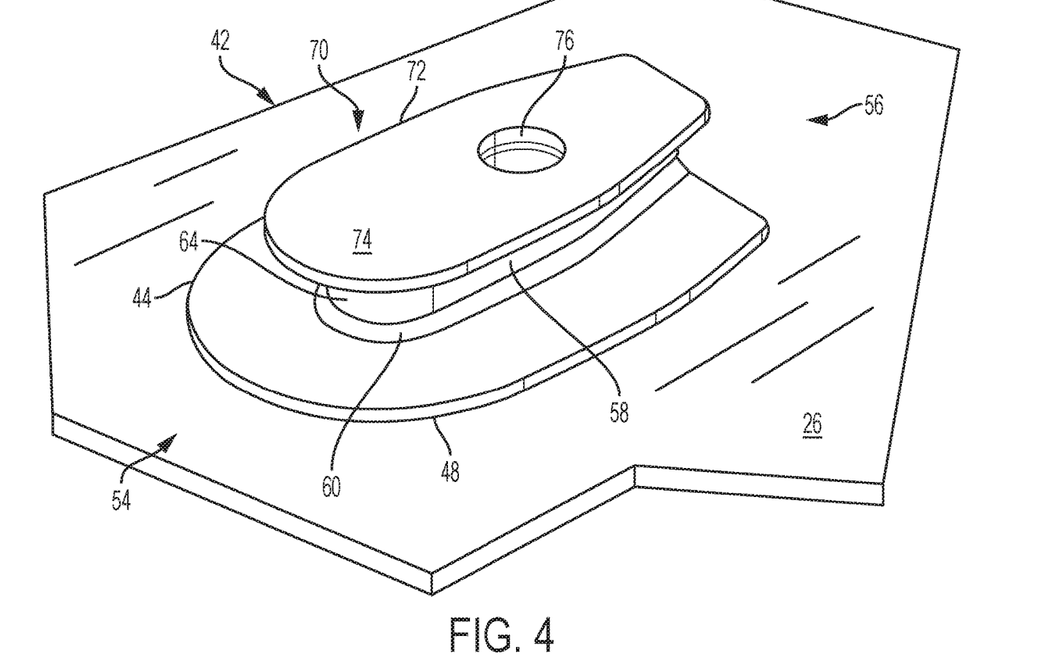
FIG. 4 is an upper and front perspective view of an illustrative drainage device according to the present disclosure mounted on a representative aerodynamic surface.
Figure 5:
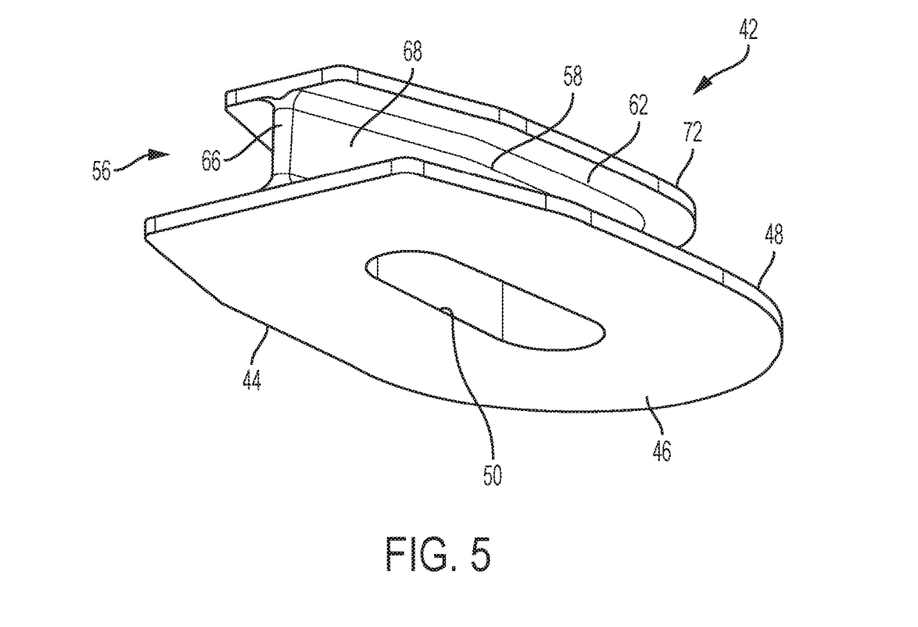
FIG. 5 is a lower and rear perspective view of the illustrative drainage device of FIG. 4.

An illustrative aerodynamic drainage device according to the present disclosure is shown in FIGS. 4 and 5. The drainage device of FIG. 4 is depicted in conjunction with and mounted upon a representative portion of aerodynamic surface 26. It should be appreciated that even though drainage device 42 of FIG. 4 is depicted as mounted upon the upper face of the aerodynamic surface 26, that the drainage devices of the present disclosure may be installed on any suitable aerodynamic surface having any orientation, including aerodynamic surfaces that define an underside surface of or on a vehicle, as shown in FIGS. 2, 3, and 6-8.

As shown in FIG. 4, drainage device 42 may include a planar base 44 that is configured for mounting over an opening or drainage port defined in an aerodynamic surface 26. As shown in FIG. 5, base 44 may further include a contact surface 46 on an underside of the base that may be configured to be substantially complementary to the aerodynamic surface upon which it is intended to be mounted, for example planar, slightly concave, convex, or otherwise curved in a manner intended to match the shape of the aerodynamic surface.

Base 44 may further include a peripheral flange 48 providing an additional area for contacting surface 26. In order to minimize drag as an airstream flows over drainage device 42, flange 48 may be substantially planar and extend at least partially circumferentially around drainage device 42. In one aspect of the present disclosure, contact surface 46 of base 44 may be substantially planar, and the drainage device would be configured to be mounted upon a correspondingly substantially planar aerodynamic surface 26.

Base 44 of drainage device 42 may be configured to be securely mounted to a corresponding aerodynamic surface 26 by any suitable method of adhesion. Base 44 may be mounted to surface 26 using an adhesive, such as a contact adhesive, thermoplastic adhesive, single-component adhesive, multi-component adhesive, natural adhesive, or synthetic adhesive, among others. Alternatively, or in addition, drainage device 42 may be mounted to surface 26 via the application of an adhesive tape over both a portion of flange 48 and a portion of surface 26, thereby securing drainage device 42. Alternatively, or in addition, drainage device 42 may be secured to surface 26 by any suitable mechanical fastener, such as a screw, a bolt, or a rivet, among others.

Figure 6:
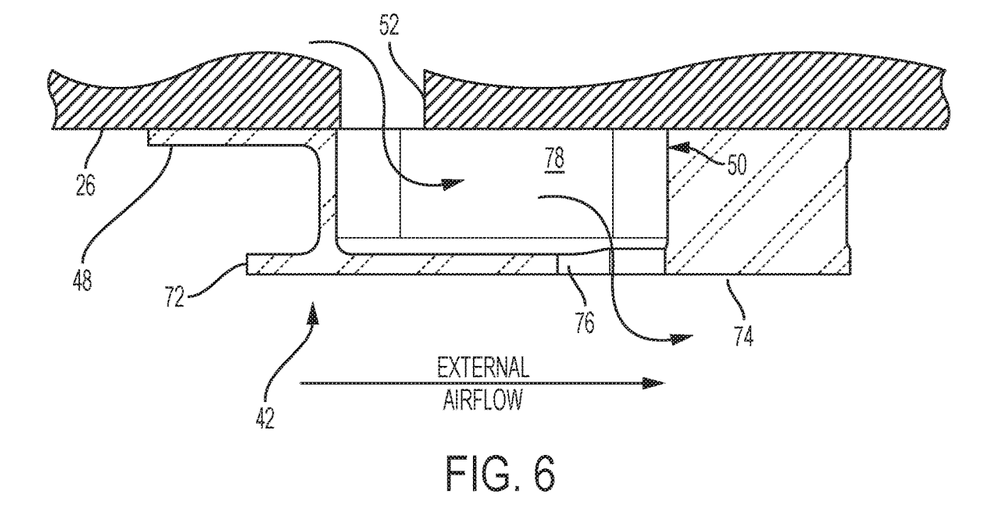
FIG. 6 is a semi-schematic and cross-sectional view of the illustrative drainage device of FIG. 4 mounted on an aerodynamic surface.

As shown in FIG. 4, contact surface 46 of drainage device 42 may define an aperture or entry port 50 in base 44 that may be configured to be aligned with an opening or drainage port 52 in aerodynamic surface 26, as shown in cross-section in FIG. 6. The entry port 50 may have any suitable shape, provided that when drainage device 42 is mounted to surface 26 entry port 50 at least partially aligns with and/or overlaps opening 52 sufficiently to permit a fluid to enter drainage device 42 via entry port 50. In one aspect of the present disclosure, entry port 50 may have an elongate opening, as depicted in FIG. 5, thereby providing some flexibility when aligning the drainage device 42 with the opening 52 and mounting drainage device 42 on surface 26.

Drainage device 42 may have a leading end 54 and a trailing end 56, where drainage device 42 is configured to be mounted upon a surface 26 with leading end 54 oriented into the direction that the typical airflow originates, and with trailing end 56 oriented into the direction away from the typical airflow origin. That is, in most cases and for most vehicles, leading end 54 may be oriented forward, while trailing end 56 may be oriented aftward, relative to the direction of travel of the vehicle.

Drainage device 42 may include a mast portion 58 that extends outwardly from base 44. Mast portion 58 may have a proximate end 60 that may be connected to the base 44, and a distal end 62 that may extend away from contact surface 46 of base 44. That is, mast portion 58 may extend outwardly with respect to the plane of aerodynamic surface 26. Mast portion 58 itself may be formed or defined by one or more wall portions. Mast portion 58 may be configured so that distal end 62 of mast portion 58 does not extend beyond the aerodynamic boundary layer adjacent surface 26. In one aspect of the disclosed drainage device, mast portion 58 has a height measured from surface 26 of at least about one-half inch (12.7 mm).

In order to help minimize the drag that may be created when drainage device 42 is mounted on a vehicle moving at high speeds, mast portion 58 may be configured to minimally disrupt the airflow around drainage device 42. The aerodynamic qualities of drainage device 42 may be enhanced where mast portion 58 includes a curved leading face 64, and a trailing face 66 formed by converging wall portions 68. When considered in a horizontal plane, or a plane parallel to the surface 26, the periphery of the mast portion 58 may resemble a teardrop shape, with the point of the teardrop extending aftward and corresponding to trailing face 66.

Distal end 62 of mast portion 58 may connect and support a top portion 70 of drainage device 42. Top portion 70 may be configured so that a periphery of the top portion 70 is greater than a periphery of mast portion 58 of drainage device 42. In one aspect of the disclosure, top portion 70 may include a fence portion 72 that may be cantilevered outwardly from mast portion 58 in a direction that is substantially parallel to the plane of surface 26, and therefore substantially parallel to the plane of contact surface 46 of base 44. Fence portion 72 may extend outwardly from at least a substantial portion of distal end 62 of mast portion 58, and thereby define a periphery of top portion 70.

In one aspect of the present disclosure, fence portion 72 surrounds and extends from at least 50% of the periphery of distal end 62 of mast portion 58. In another aspect of the present disclosure, fence portion 72 may extend outwardly from at least that portion of distal end 62 of mast portion 58 that is disposed along leading end 54 of drainage device 42. Fence portion 72 may extend in an upstream direction from leading face 64 of mast portion 58 by at least about one-quarter inch (6.35 mm). In another aspect of the present disclosure, fence portion 72 surrounds and extends from distal end 62 of mast portion 58 as well as at least 50% of each of the right and left sides of distal end 62.

As shown in FIGS. 4 and 6, surface 74 of top portion 70 may include an exit port 76 that may be in fluid communication with opening 52 in contact surface 46 of drainage device 42. By fluid communication is meant any channel or passage between opening 52 and exit port 76 that is configured to permit the movement of a fluid therebetween. In one aspect of the disclosed drainage device, mast portion 58 may be partially or substantially hollow, and exit port 76 may provide an opening to interior 78 of mast portion 58, which is also in communication with entry port 50.

Surface 74 may correspond at least substantially to a plane, or may incorporate a concavity, convexity, or other degree of curvature. Where surface 74 at least substantially defines a plane, the plane may be oriented parallel to the plane of vehicle surface 26 which contains opening 52. Alternatively, a substantially planar surface 74 may be angled slightly either forward or aftward, typically by less than five degrees with respect to the plane of vehicle surface 26.

In one aspect of the disclosed drainage device, exit port 76 is disposed in surface 74 closer to trailing end 56 of drainage device 42 than to leading end 54. Typically, therefore drainage device 42 is configured so that when mounted on surface 26 so that entry port 50 is over opening 52, exit port 76 is disposed downstream from opening 52.

Figure 7:
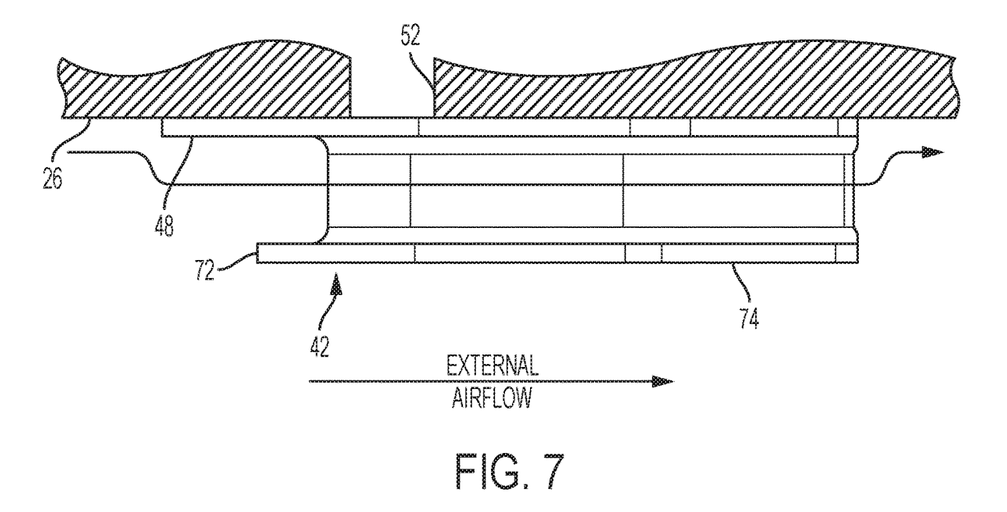
FIG. 7 is a side view of the illustrative drainage device of FIG. 6.
Figure 8:
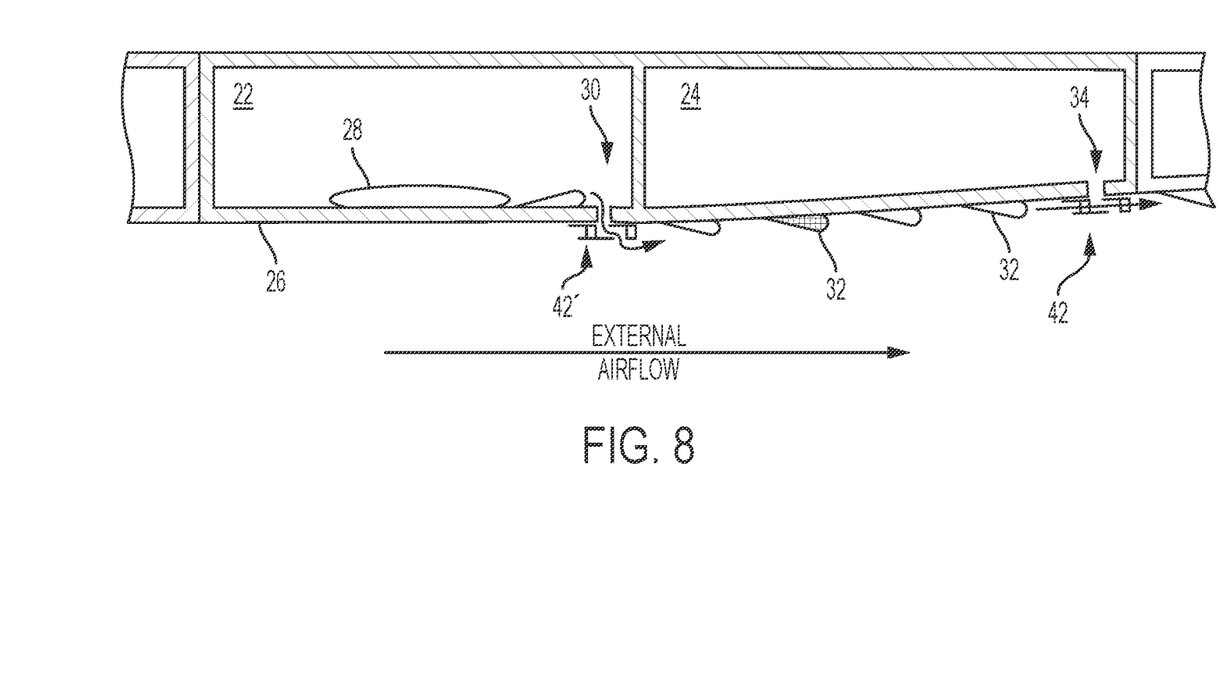
FIG. 8 depicts the exemplary compartments of FIG. 2 equipped with exemplary drainage devices according to the present disclosure.

The ability of drainage device 42 to prevent reingestion of a drained fluid is shown semi-schematically in FIGS. 6, 7, and 8. FIG. 6 depicts a drainage device 42' disposed on an underside of a surface 26. Drainage device 42' is shown in cross-section to show the alignment of entry port 50 over opening 52. Drainage device 42' of FIG. 6 may be attached to an opening or drainage port 52 in, for example, forward compartment 22. In the event that undesired fluid accumulates in forward compartment 22, the fluid could follow the path defined by the arrows of FIG. 6, out opening 52 into interior space 78 of mast portion 58, and then out exit port 76 in surface 74. Once the fluid leaves exit port 76, it would be carried downstream by the prevailing airflow.

FIG. 7, in contrast, depicts a side view of a drainage device 42 disposed over opening 52 in aft compartment 24. Drained fluid from an upstream compartment may flow along surface 26 until it reaches drainage device 42. Due to the aerodynamic shape of mast portion 58, the drained fluid would be carried by the prevailing airflow around mast portion 58 and off trailing face 66 of mast portion 58. The presence of fence portion 72, particularly where fence portion 72 surrounds and extends from distal end 62 of mast portion 58 as well as at least a portion of each of the right and left sides of distal end 62 of drainage device 42 may enhance the ability of fence portion 72 to prevent such fluids from reaching outer surface 74 of drainage device 42, and therefore may prevent the drained fluid from reaching exit port 76. Reingestion of the drained fluid is therefore prevented.

As shown in FIG. 8, a first small-scale and low-drag drainage device 42 of the present disclosure may be mounted to an aerodynamic surface of a vehicle, such as along a local streamline, in alignment with a first drainage port or opening 34. The drainage device may then prevent ingestion of fluid that may have been discharged from a second opening 30 upstream from the first opening 34, inlcuding fluid discharged via a second upstream drainage device 42' mounted on the second opening. Drainage device 42 can prevent the ingestion of such fluid running along the aerodynamic surface without appreciably changing the pressure of the compartment that is being drained. Aerodynamic mast portion 58 elevates fence portion 72 parallel to the local aerodynamic surface, and prevents fluid on the surface from climbing up and into exit port 76.

EXAMPLES AND ALTERNATIVES

The following examples describe selected aspects of exemplary drainage devices. These examples are intended for illustration and should not be interpreted as limiting the entire scope of the present disclosure. Each example may include one or more distinct disclosures, and/or contextual or related information, function, and/or structure.

Example 1

This section describes additional aspects and features of the scuppers or drainage devices of the present disclosure, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations. Each of the paragraphs including the term "substantially" may also be provided in the same form excepting that the term "substantially" is deleted.

A. A drainage device, comprising:
a base configured for mounting over an opening in an aerodynamic surface, the base having a contact surface configured for mounting on the aerodynamic surface and an entry port,
a mast portion having a proximate end and a distal end, the proximate end being connected to the base and extending away from the contact surface of the base,
a top portion connected to the distal end of the mast portion, wherein the top portion has an exit port in fluid communication with the entry port and a peripheral edge that extends beyond at least a portion of a periphery of the mast portion.

A1. The drainage device of paragraph A, wherein the top portion has a leading end and a trailing end, the leading end including a fence portion cantilevered out from the mast portion.

A2. The drainage device of paragraph A1, wherein the fence portion surrounds at least 50% of the periphery of the mast portion.

A3. The drainage device of paragraph A1, wherein the exit port is closer to the trailing end than the leading end.

A4. The drainage device of paragraph A, wherein the exit port is in a plane parallel to a plane containing the opening in the aerodynamic surface.

A5. The drainage device of paragraph A, wherein the mast portion has a trailing face formed by converging wall portions.

A6. The drainage device of paragraph A, wherein each of the mast portion and the top portion have leading curvatures, a radius of the leading curvature of the mast portion being smaller than a radius of the leading curvature of the top portion.

A7. The drainage device of paragraph A, wherein the base is configured for mounting on the aerodynamic surface such that the exit port is downstream from the opening.

A8. The drainage device of paragraph A, wherein the aerodynamic surface is on a vehicle.

B. A drainage system, comprising
an aerodynamic surface on a vehicle, the surface having an upstream portion and a downstream portion relative to airflow over the surface when the vehicle is translating, and an opening defined in the aerodynamic surface, and
a scupper device mounted on the aerodynamic surface over the opening, the scupper device having a cantilevered fence portion extending in an upstream direction relative to the aerodynamic surface.

B1. The drainage system of paragraph B, wherein the scupper device has a mast portion having a distal end and extending away from the aerodynamic surface, the fence portion extends from at least 50% of a periphery of the distal end of the mast portion.

B2. The drainage system of paragraph B, wherein the scupper device has a top portion distal from the aerodynamic surface, the top portion having an exit port downstream from the opening.

B3. The drainage system of paragraph B2, wherein the exit port and the opening are in substantially parallel planes.

B4. The drainage system of paragraph B1, wherein the mast portion has a height of at least about ½ inch.

B5. The drainage system of paragraph B, wherein the fence portion extends in an upstream direction by at least about ¼ inch.

C. A drainage system, comprising
an aerodynamic surface on a vehicle, the surface having an upstream portion and a downstream portion relative to airflow over the surface when the vehicle is translating, and a first opening defined in the aerodynamic surface, and
a first scupper device mounted on the aerodynamic surface over the opening, the first scupper device including a cap having an exit port downstream from the first opening.

C1. The drainage system of paragraph C, wherein the exit port and the opening are substantially contained in parallel planes.

C2. The drainage system of paragraph C, further comprising a second opening defined in the aerodynamic surface, the second opening being upstream from the first opening, and
the first scupper includes a top portion having a cantilevered fence portion extending upstream toward the second opening.

C3. The drainage system of paragraph C2, further comprising,
a second scupper device mounted over the second opening, and including a top portion having a cantilevered fence portion extending upstream.

C4. The drainage system of paragraph C3, wherein each of the scupper devices has an exit port defined in the top portion, downstream from its respective opening.

Advantages, Features, Benefits

The different examples of scuppers and drainage devices described herein provide several advantages over previous scuppers. More specifically, the presently described drainage devices permit rapid and easy mounting onto the desired aerodynamic surface, are low cost, and substantially prevent reingestion of drained fluids. Additionally, the aerodynamic profile of the drainage devices minimizes impacts on fuel economy due to additional drag caused by the projecting drainage devices.

CONCLUSION

The disclosure set forth above may encompass multiple distinct disclosures with independent utility. Although each of these disclosures has been disclosed in its preferred form(s), the specific examples thereof as disclosed and illustrated herein are not to be considered in a limiting sense, because numerous variations are possible. The subject matter of the disclosures includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different disclosure or to the same disclosure, and whether broader, narrower, equal, or different in scope to the original claims, also are regarded as included within the subject matter of the present disclosure.

What is claimed is:

1. A drainage device, comprising:
a base configured for mounting over an opening in an aerodynamic surface, the base having a contact surface configured for mounting on the aerodynamic surface and an entry port,
a mast portion having a proximate end and a distal end, the proximate end being connected to the base and extending away from the contact surface of the base,
a top portion connected to the distal end of the mast portion, wherein the top portion has an exit port in fluid communication with the entry port, and a peripheral edge of the top portion that extends beyond at least a portion of a periphery of the mast portion in an upstream direction relative to the aerodynamic surface to form a cantilevered fence portion.

2. The drainage device of claim 1, wherein the top portion has a leading end and a trailing end, and the cantilevered fence portion extends farther from the leading end of the top portion than the cantilevered fence portion extends from the trailing end of the top portion.

3. The drainage device of claim 2, wherein the cantilevered fence portion extends from at least 50% of the periphery of the top portion.

4. The drainage device of claim 2, wherein the exit port is closer to the trailing end of the top portion than the leading end of the top portion.

5. The drainage device of claim 1, wherein the exit port is in a plane parallel to a plane containing the opening in the aerodynamic surface.

6. The drainage device of claim 1, wherein the mast portion has a trailing face formed by converging wall portions.

7. The drainage device of claim 1, wherein each of the mast portion and the top portion have leading curvatures, a radius of the leading curvature of the mast portion being smaller than a radius of the leading curvature of the top portion.

8. The drainage device of claim 1, wherein the base is configured for mounting on the aerodynamic surface such that the exit port is downstream from the opening.

9. The drainage device of claim 1, wherein the aerodynamic surface is on a vehicle.

10. A drainage system, comprising
an aerodynamic surface on a vehicle, the surface having an upstream portion and a downstream portion relative to airflow over the surface when the vehicle is translating, and an opening defined in the aerodynamic surface, and
a scupper device mounted on the aerodynamic surface over the opening, the scupper device having:
a mast portion extending away from the aerodynamic surface; and
a cantilevered fence portion extending from a distal end of the mast portion in an upstream direction relative to the aerodynamic surface.

11. The drainage system of claim 10, wherein the the cantilevered fence portion extends from at least 50% of a periphery of the distal end of the mast portion.

12. The drainage system of claim 10, wherein the scupper device has a top portion distal from the aerodynamic surface, the top portion having an exit port downstream from the opening.

13. The drainage system of claim 12, wherein the exit port and the opening are in substantially parallel planes.

14. The drainage system of claim 11, wherein the mast portion has a height of at least ½ inch.

15. The drainage system of claim 10, wherein the fence portion extends in an upstream direction by at least ¼ inch.

16. A drainage system, comprising
an aerodynamic surface on a vehicle, the surface having an upstream portion and a downstream portion relative to airflow over the surface when the vehicle is translating, and a first opening defined in the aerodynamic surface, and
a first scupper device mounted on the aerodynamic surface over the first opening, the first scupper device including:
a mast portion having a proximal end connected to the aerodynamic surface and a distal end extending away from the aerodynamic surface; and
a top portion connected to the distal end of the mast portion, the top portion having an exit port that is downstream from the first opening and a peripheral edge that extends beyond at least a portion of a periphery of the mast portion in an upstream direction to form a cantilevered fence portion.

17. The drainage system of claim 16, wherein the exit port and the first opening are substantially contained in parallel planes.

18. The drainage system of claim 16, further comprising a second opening defined in the aerodynamic surface, the second opening being upstream from the first opening.

19. The drainage system of claim 18, further comprising, a second scupper device mounted over the second opening, and including a top portion having a cantilevered fence portion extending upstream.

20. The drainage system of claim 19, wherein each of the first and second scupper devices has an exit port defined in its top portion, and wherein each exit port is disposed downstream from the corresponding first and second opening.

* * * * *